United States Patent [19]

Deutsch et al.

[11] Patent Number: 5,577,115
[45] Date of Patent: Nov. 19, 1996

[54] CUSTOMER PREMISE EQUIPMENT INTERFACE

[75] Inventors: Douglas A. Deutsch, Carol Stream, Ill.; Norman W. Petty, Boulder, Colo.; Douglas J. Rippe, Naperville, Ill.

[73] Assignee: Lucent Technologies Inc., Murray Hill, N.J.

[21] Appl. No.: 414,561

[22] Filed: Mar. 31, 1995

[51] Int. Cl.$^6$ .............. H04M 1/00; H04M 1/24; H04J 3/12; H04J 3/14

[52] U.S. Cl. .............. 379/399; 379/412; 379/27; 370/13; 370/16; 370/110.1

[58] Field of Search ............... 379/157, 165, 379/201, 399, 412, 32, 33, 26, 2, 29, 27; 370/13, 16, 79, 60, 60.1, 94.1, 94.2, 110.1

[56] References Cited

U.S. PATENT DOCUMENTS

| | | | |
|---|---|---|---|
| 4,856,059 | 8/1989 | Halbig | 379/412 |
| 4,884,269 | 11/1989 | Duncanson et al. | 370/110.1 |
| 4,905,237 | 2/1990 | Voelzke | 370/110.1 |
| 4,922,490 | 5/1990 | Blakley | 370/110.1 |
| 4,958,369 | 9/1990 | Tsuchida | 379/156 |
| 5,008,884 | 4/1991 | Yazawa et al. | 370/110.1 |
| 5,034,948 | 7/1991 | Mizutani et al. | 370/110.1 X |
| 5,142,568 | 8/1992 | Ogata et al. | 379/100 |
| 5,142,571 | 8/1992 | Suzuki et al. | 379/32 X |
| 5,166,975 | 11/1992 | Maei | 370/110.1 X |
| 5,189,663 | 2/1993 | Williams | 370/17 |
| 5,204,860 | 4/1993 | Sparks | 370/110.1 |
| 5,204,861 | 4/1993 | Wiebe | 370/110.1 |
| 5,208,806 | 5/1993 | Hasegawa | 370/60.1 |
| 5,208,846 | 5/1993 | Hammond et al. | 379/15 |
| 5,267,300 | 11/1993 | Kao et al. | 370/13 X |
| 5,305,312 | 4/1994 | Fornek et al. | 370/110.1 X |
| 5,311,590 | 5/1994 | Arnold et al. | 379/387 |
| 5,418,625 | 5/1995 | Shimoosawa | 370/60.1 X |
| 5,448,573 | 9/1995 | Yamaguchi | 379/2 X |
| 5,448,635 | 9/1995 | Biehl et al. | 379/399 |
| 5,469,282 | 11/1995 | Ishioka | 379/412 X |
| 5,481,605 | 1/1996 | Sakurai et al. | 370/60.1 X |

*Primary Examiner*—Krista M. Zele
*Assistant Examiner*—Devendra Kumar
*Attorney, Agent, or Firm*—Dennis J. Williamson

[57] ABSTRACT

A CPE such as an ISDN telephone subset or multimedia equipment includes an interface recognition unit that connects to the network interface and adapts itself to allow the CPE to be used with standard ISDN interfaces and an analog interface. The interface recognition unit includes an interface recognition switch (IRS) that performs two functions. First, the IRS protects the CPE from damage in those instances where a non-standard network interface is connected to the CPE. Second, for standard interfaces, it identifies the type of network interface and routes the incoming signals appropriately. Specifically, if the IRS detects a T interface, the incoming signals are switched directly to a T interface circuit for controlling and powering the higher functions of the CPE. If the IRS detects a U interface, incoming signals are automatically switched to a U interface circuit for controlling and powering the CPE. Alternatively, an interface adapter is provided that delivers the signals to circuitry relating to one of the standard interfaces and monitors the CPE to determine if it is operable. If the CPE is operable, the connection is maintained. If it is not operable, the interface adapter reroutes the signals to circuitry relating to a second one of the standard interfaces. The CPE is again monitored to determine if it is operable. If it is operable, the connection is maintained. If it is not operable the connection is blocked. The IRS and interface adapter can also detect if the network interface is an analog line and route the analog signals to an analog circuit provided in the ISDN CPE such that the ISDN CPE can function as an analog telephone.

9 Claims, 9 Drawing Sheets

CUSTOMER PREMISE EQUIPMENT INTERFACE

CROSS-REFERENCE TO RELATED APPLICATION

This application is related to the application of Douglas A. Deutsch, Norman W. Petty, and Douglas J. Rippe entitled "An Improved Customer Premise Equipment Interface" (Ser. No. 08/414,560) which application is assigned to the assignee of the present application and is being filed concurrently herewith.

TECHNICAL FIELD

The invention relates, generally, to an improved interface for customer premise equipment (CPE) and, more particularly, to a CPE interface that is compatible with a plurality of standard Integrated Services Digital Network (ISDN) interfaces and allows an ISDN CPE to be used on a traditional analog telephone line.

BACKGROUND OF THE INVENTION

ISDN switching systems are deployed around the world, making new features and services available to customers. According to ISDN standards as set forth by the International Telegraph and Telephone Consultative Committee (CCITT), ISDN CPEs communicate with ISDN switching systems in two 64 kilobits per second (kbps) channels, referred to as B-channels, and in one 16 kbps channel referred to as a D-channel. Each of the B-channels is usable to convey digitized voice samples at the rate of 8,000 8-bit samples per second or data at a rate of 64 kbps. The D-channel is used both to convey signaling packets to effect message signaling between ISDN stations and switches or other ISDN stations and to convey data packets among ISDN stations. ISDN provides end-to-end digital connectivity to transmit voice, audio, visual and data information through a limited set of service independent user-network interfaces.

The interfaces for transmission between ISDN CPEs and an ISDN line to a switching system is a digital subscriber line (DSL). One such interface is a 4-wire DSL that conveys a serial bit stream at the rate of 192 kbps, which comprises 144 kbps, for the above-mentioned two 64 kbps B-channels and one 16 kbps D-channel and an additional 48 kbps used for a number of functions including framing, DC balancing, control and maintenance. A 4-wire DSL is referred to by the CCITT as the T interface. CCITT recommendations also recognize a U interface, which provides ISDN service using a 2-wire DSL. This 2-wire DSL transmits a serial bit stream at the rate of 80 kbps where each bit conveys four levels of information, yielding an effective data rate of 160 kbps, thus providing two 64 kbps B-channels, one 16 kbps D-channel, and 16 kbps for signaling and maintenance information. Both the T and U interfaces include a further pair of wires for powering the CPE. As will be appreciated, a typical ISDN telephone requires a minimum of 34 V DC to operate.

While the U and T interfaces are constructed and operate differently, both interfaces can be found on customer premises for connection directly to the CPE. Because different data bit streams are transmitted over different lines and at different rates for the two interfaces, a CPE will only function if the CPE interface is compatible with the network interface. Thus, if a T interface CPE is connected to a U interface on the network the CPE will not operate. The reverse is also true.

A U to T converter, known as an NT1, has been developed that converts a U interface network to a T interface such that a T interface CPE can be used with the U interface network. A problem with the NT1 is that the user must know whether the network interface is a T or a U and whether the CPE interface is a T or U. It is only after this diagnosis is made that the user will be able to use the U to T converter. Moreover, to insure that any CPE is usable at any ISDN interface, the user must have a separate converter available at each network interface.

Further, while the design of both the U and T interfaces are now standardized, non-standard U interfaces were designed as a result of CCITT recommendations that allowed the local service provider to develop its own U interface design (the standard T interface was limited to a single mandatory design with the expectation that it would provide a standard interface for premises equipment manufacturers). In the United States, where a number of independent carriers provide local service in different geographic areas, different service providers developed and used different U interface designs until 1990 when the standardized 2B1Q was adopted by American National Standards Institute (ANSI). Although this standard U interface was adopted in 1990, existing non-standardized U interfaces remain in use. Because these non-standard network interfaces deliver power and/or signals on different lines than the standard ISDN interfaces, standard ISDN CPEs will not operate with these interfaces. Moreover, because power is delivered on different leads, it is possible to damage a standard ISDN CPE by connecting it to a non-standard U network interface.

In addition to ISDN systems, traditional analog telephone systems are widely used. Network interfaces for analog lines consist of a single pair of wires (tip and ring) for transmitting both signals and power to the telephone station set. Thus, unlike ISDN interfaces, network interfaces for analog lines do not include a separate pair of wires for transmitting power to the CPE. The typical analog telephone requires 48 V DC to operate.

Therefore, a problem in the art exists in that because of various network interfaces, the installation and relocation of CPE equipment requires significant user knowledge and diagnostics.

SUMMARY OF THE INVENTION

This problem is solved and a technical advance is achieved in the art by providing for use with a CPE such as an ISDN station set, multimedia equipment or the like the interface adapter of the invention. The interface adapter of the invention connects to the network interface to route the signals of the network interface based on information provided by the CPE. The interface adapter includes an interface adapter switch controlled by a microprocessor that performs two functions. First, the interface adapter switch protects the CPE from damage in those instances where a non-standard network interface is connected to the CPE. Second, it routes the signals from the network interface in response to signals produced by the CPE. It will be appreciated that existing ISDN CPEs include a microprocessor, known as a station set controller, that communicates with the network to confirm that the CPE is operating with the network. The microprocessor of the interface adapter of the invention monitors these communications and controls the routing of the signals based on whether the CPE is operating. Specifically, upon initial connection of the CPE to the network interface, the interface adapter switch routes the signals from the network to the circuitry controlling the CPE based on the assumption that the network is a T interface. The interface adapter monitors the communications between the CPE and the network to determine if the CPE is operable. If the CPE is operable, the interface adapter maintains this connection. If the CPE is not operable, interface adapter switch reroutes the signals and delivers the signals to other circuitry controlling the CPE and the interface adapter continues to monitor the communications between the CPE and the network. If the CPE is operable, the interface adapter maintains the second connection. Alternatively, the interface adapter could be provided with the circuit for determining if the CPE is operating such that communication between the interface adapter and the CPE station set controller is not required. Advantageously, the interface adapter may also detect if the network interface terminates an analog line and route the analog signals to an analog circuit provided in the CPE such that the CPE can function as an analog telephone.

DETAILED DESCRIPTION

Figure 1A:
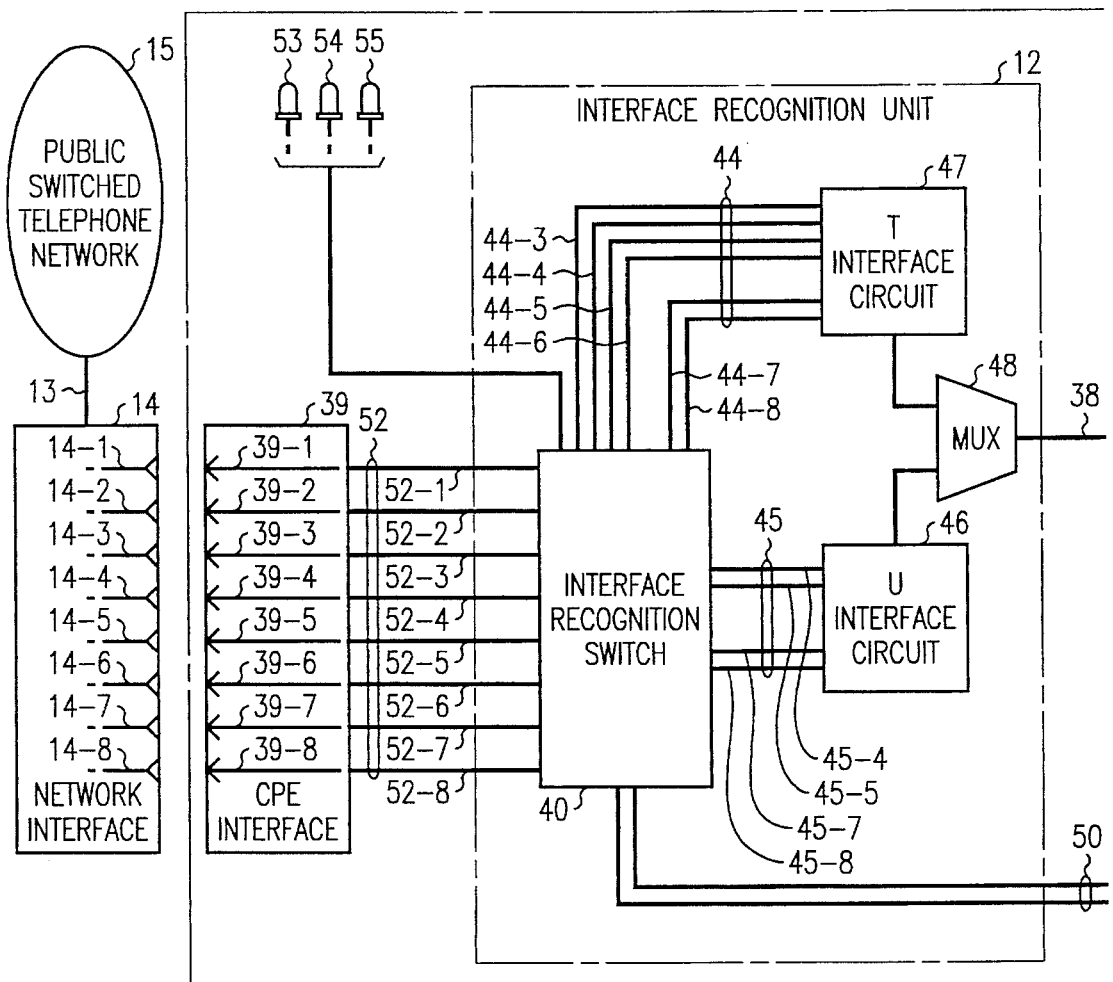
FIG. 1A is a portion of a block diagram of a CPE including the interface recognition unit of the invention.
Figure 1B:
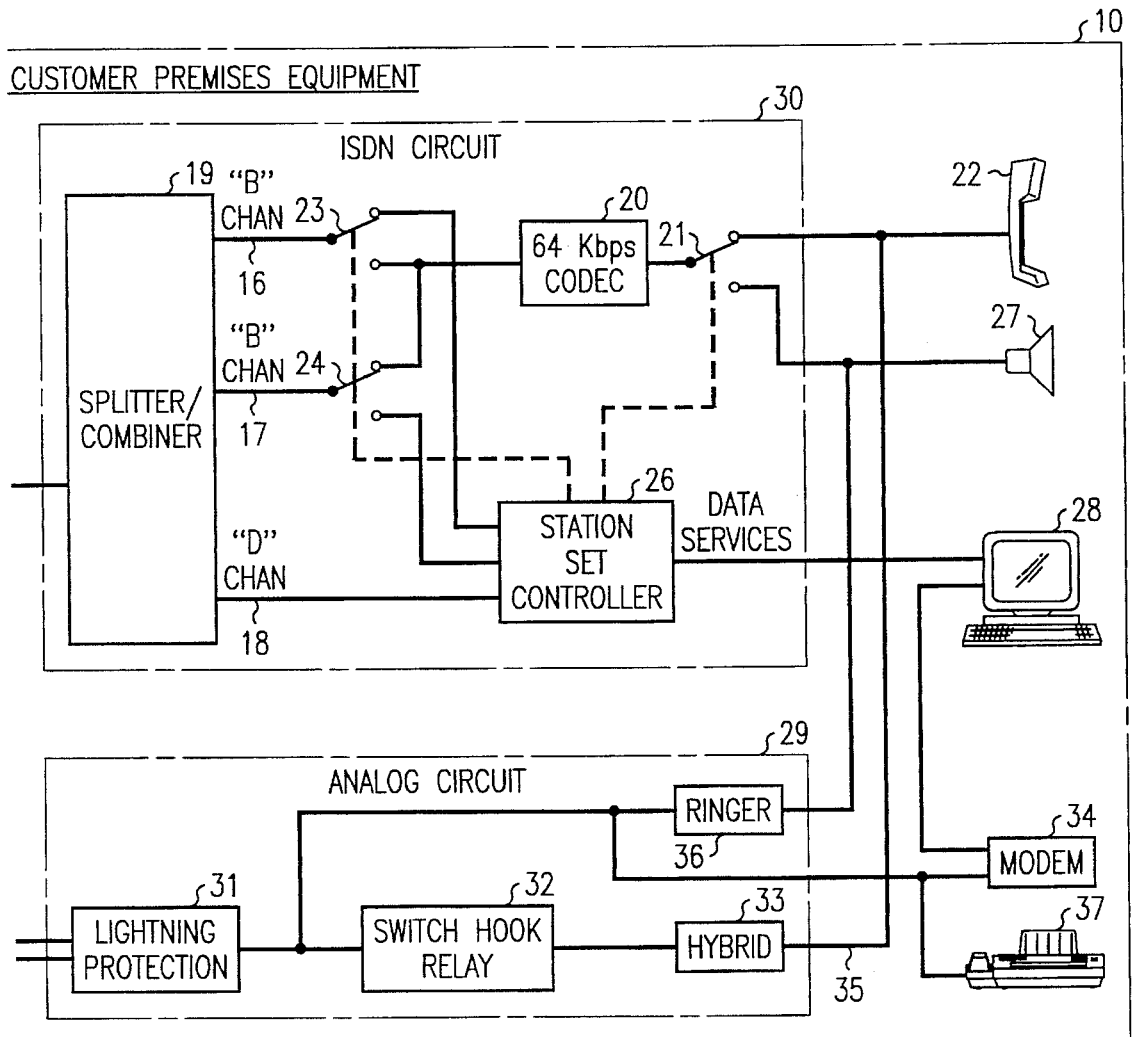
FIG. 1B is another portion of the block diagram of a CPE including the interface recognition unit of the invention.

Referring more particularly to FIGS. 1A and 1B, the CPE of the invention is shown generally at 10 and can consist of an ISDN telephone subset having audio and/or video displays, a data terminal, multimedia equipment, or other ISDN compatible device. CPE 10 includes an interface recognition unit 12 for connection to the interface 14 of network 15.

Network interface 14 terminates either an ISDN digital or analog subscriber line 13 from network 15 and may be a T interface, standard U interface, non-standard U interface, or an analog line interface. The standard network interface 14 includes eight lines, 14-1 through 14-8, for connection to the CPE to deliver power and signals thereto. If network interface 14 is an ISDN T interface, lines 14-3 through 14-6 of the interface transmit the signals to the CPE 10. If the network interface 14 is the ANSI standard 2B1Q U interface, lines 14-4 and 14-5 transmit the signals to CPE 10. For both the T and U interface power can be delivered over lines 14-7 and 14-8; however, power can also be delivered to the CPE from an external source separate from the network interface 14. Finally, for T interfaces power is also delivered on pair 14-4 and 14-5 and on pair 14-3 and 14-6. Typically, a minimum of 34 V DC is delivered to the CPE immediately upon connection to the ISDN network interface. If network interface 14 is a non-standard U interface the power and signals could be delivered at different voltage levels and on lines in various combinations other than those described above. Finally, if network interface 14 terminates an analog line, both the voice signals and power will be delivered over lines 14-4 and 14-5. Typically, an analog line carries 48 V DC, and 88 V AC RMS to ring the telephone.

If ISDN signals are connected to CPE 10 via interface recognition unit 12, CPE 10 will function as an ISDN subset using standard ISDN circuitry, shown generally at 30 in FIG. 1B. Specifically, the two B-channels and the D-channel from the digital subscriber line 13 are demultiplexed onto separate paths 16, 17 and 18 by a splitter/combiner 19. In the present embodiment, the 64 kilobits per second B-channels on paths 16 and 17 are used for either voice or data depending on the position of a voice/data switches 23 and 24, operated under the control of station set controller 26. Station set controller is typically a microprocessor such as a Motorola 68000 family processor. When switches 23 and 24 are positioned to connect either paths 16 and 17, respectively, with a codec 20, digitized speech signals on these paths are converted to analog signals by codec 20. Switch 21, operated under the control of a station set controller 26, connects codec 24 either to speaker 27 or handset 22 thereby to transmit the signals generated by codec 20 for audible speech transmission. In the reverse direction, the analog speech signals generated by the transmitter of handset 22 (or a speaker phone transmitter) are transmitted via switch 21 for coding by codec 20 into a 64 kilobits per second digitized speech signal on either path 16 or path 17 depending on the positions of switches 23 and 24. The B-channels on paths 16 and 17 are multiplexed onto subscriber line 13 by splitter/combiner 19. The B-channel path not being used for voice transmission may be used to convey digital data to a data terminal 28 by connecting either of paths 16 or 17 to station set controller 26 via voice/data switches 23 and 24 operated under the control of station set controller 26. The D-channel on path 18 is used for user packet data and for control communication between station set controller 26 and a switching system of network 15.

CPE 10 also includes analog circuitry, the construction of which is conventional and is shown generally at 29 in FIG. 1B. Tip-ring pair 50 are connected through lightning protection device 31 and switch hook relay 32. Switch hook relay 32 provides an off-hook indication to the network. Signals are delivered from switch hook relay 32 to a two-wire to four-wire converter circuit or hybrid 33. Hybrid 33 converts tip and ring (a full duplex connection to the telephone network), to receive and transmit audio path 35. Audio path 35 is connected to the handset 22 receiver and signals are received from the handset transmitter and delivered back through the circuit 29. It will be appreciated that analog circuit 29 could be connected to a modem 34 for connection to a terminal or to a fax machine 37 as is known in the art. To ring the telephone, a switch (not shown) in network 15 applies a ringing signal (88 V AC RMS) through lightning protection circuit 31. The ringing signal is delivered from the tip and ring pair to a ringer circuit 36. Ringer circuit 36 provides an indication of an incoming call in the form of audible signals.

To identify the network interface 14 and to properly route signals to the appropriate circuitry for controlling the CPE, interface recognition unit 12 connects to network interface 14. Interface recognition unit 12 includes an interface recognition switch (IRS) 40 for comparing the signals on lines 14-1 through 14-8 to the known signals for the various interfaces described above and for routing the signals based on the results of those comparisons. An exemplary construction of the IRS 40 will be described with reference to FIG. 2.

Preferably, interface recognition unit 12 includes an input RJ-45 interface 39 that can be releasably connected to network interface 14. Interface 39 includes eight leads or conductors 39-1 through 39-8 for connection with the eight leads or conductors 14-1 through 14-8 from network interface 14 to create an electrical pathway or connection between the network interface 14 and. CPE interface 39 (FIG. 1A). The CPE interface leads 39-1 through 39-8, in turn, are connected to leads or conductors 52-1 through 52-8. A power test circuit 42 is connected to each of leads or conductors 52-1 through 52-8 to detect for power delivered from the network interface 14. Power test circuit 42 can consist of a simple comparator circuit that opens or closes a gate based on the voltage input to the circuit. The results of the power test circuit 42 are delivered to microprocessor 41. Microprocessor 41 can include a Motorola 68000 family processor or other similar processor for controlling the position of switches 51-1 through 51-8 based on the results of the power test circuit. Alternatively, microprocessor 41 could be replaced by logic circuitry for controlling the position of switches 51-1 through 51-8. Specifically, if power associated with analog service is detected on leads 52-4 and 52-5 or power associated with standard ISDN service is detected on leads 52-4 and 52-5 or 52-7 and 52-8, the microprocessor recognizes that the network is either the standard ISDN T interface or U interface or an analog line. If power other than standard ISDN or analog service is detected on lines 52-1 through 52-8, the microprocessor recognizes a power fault condition. In response to the detection of a power fault condition, the microprocessor 41 maintains switches 51-1 through 51-8 on leads 52-1 through 52-8 open, thereby blocking the connection to prevent damaging the CPE. It will be appreciated that power delivered at the wrong voltage or on the wrong lines will literally smoke the CPE circuitry if the connection is not blocked.

If, after performing the power test, the microprocessor 41 recognizes power associated with an analog interface (i.e. 48 V DC on lines 52-4 and 52-5), the microprocessor can assume that line 13 is providing analog service and close switches 51-1 through 51-8. Because U interfaces sometimes deliver power on lines 52-4 and 52-5, however, the power test is not necessarily conclusive; therefore, a dial tone test is run by the CPE to confirm this conclusion. The dial tone test is accomplished by connecting leads 52-4 and 52-5 to a pair of band pass filters 62 and 63, via an AC coupler (not shown) to provide electrical isolation, to detect for the frequency components corresponding to analog service (350 Hz and 440 Hz). Band pass filters 62 and 63 provide output voltages directly proportional to the frequency component being examined. The microprocessor 41 compares the output voltages from band pass filters 62 and 63 to the known voltages corresponding to the frequency components for analog service. If these frequencies are the same, the presence of analog service is confirmed. The microprocessor configures switch matrix 43 to route incoming signals to analog circuit 29 via tip and ring line 50 to control operation of CPE 10 as an analog telephone station.

If the power test indicates a power condition corresponding to one of the standard ISDN interfaces, switches 51-1 through 51-8 are closed to complete the connection. In a preferred embodiment, the switches 51-1 through 51-8 are ganged together and closed simultaneously. In an alternate embodiment, switches 51-1 through 51-8 could be maintained open until after the signal characteristics of the interface are detected, as will hereinafter be described. If the microprocessor 41 identifies power associated with the standard ISDN network interfaces, it must then examine the signal characteristics of the interface to determine if the interface is a U interface or T interface.

The microprocessor 41 detects predetermined signal characteristics that distinguish between the standard T and U interfaces and configures switch matrix 43 based on those characteristics. In the illustrated embodiment the microprocessor distinguishes the U and T interfaces by looking at the frequency spectrum of the signals on lines 52-4 and 52-5 for a peak at 80 KHz corresponding to the U interface. The microprocessor could detect for any line characteristic that distinguishes between the standard T and U interfaces such as bit rate. To determine the type of interface, lines 52-4 and 52-5 are connected to band pass filter 64 tuned to 80 KHz and having a sufficiently high peak to preclude harmonics. Such a circuit provides an output voltage directly proportional to the frequency component being examined as will be appreciated. Other circuits could be used to detect the signal characteristics such as a lock-in amplifier circuit, switch capacitor filter or a finite impulse response filter. The output voltage from band pass filter 64 is delivered to microprocessor 41 which compares the output voltage to the known output voltage for the component of the frequency spectrum corresponding to the standard U interface. The microprocessor then determines if the signal is a U interface. If it is not a U interface, the microprocessor 41 can assume the interface is a T interface. Alternatively, the system could employ a second band pass filter (not shown) tuned to 192 KHz to specifically test for the T interface. Based on the results of the signal characteristic test, the microprocessor 41 configures switch matrix 43 to route the signals appropriately. Specifically, a 192 kbps bit rate signal (T interface) is routed to T interface output 44 of IRS 40 and a 80 kbps bit rate signal (U interface) is routed to the U interface output 45 of IRS 40.

Once the microprocessor has determined the type of network interface, a visual or audible display may be provided to the customer so that the customer is aware of the nature of the service he or she is receiving. Specifically, visual indicators such as a series of LEDs 53, 54 and 55 are provided on the CPE. The microprocessor 42 lights the LED corresponding to the detected network interface to provide a visual indication to the customer. Alternatively, the indication could be made in the existing visual display of the ISDN CPE, as is known in the art. Or an audible indication could be provided over speaker 27, if desired.

Figure 2:
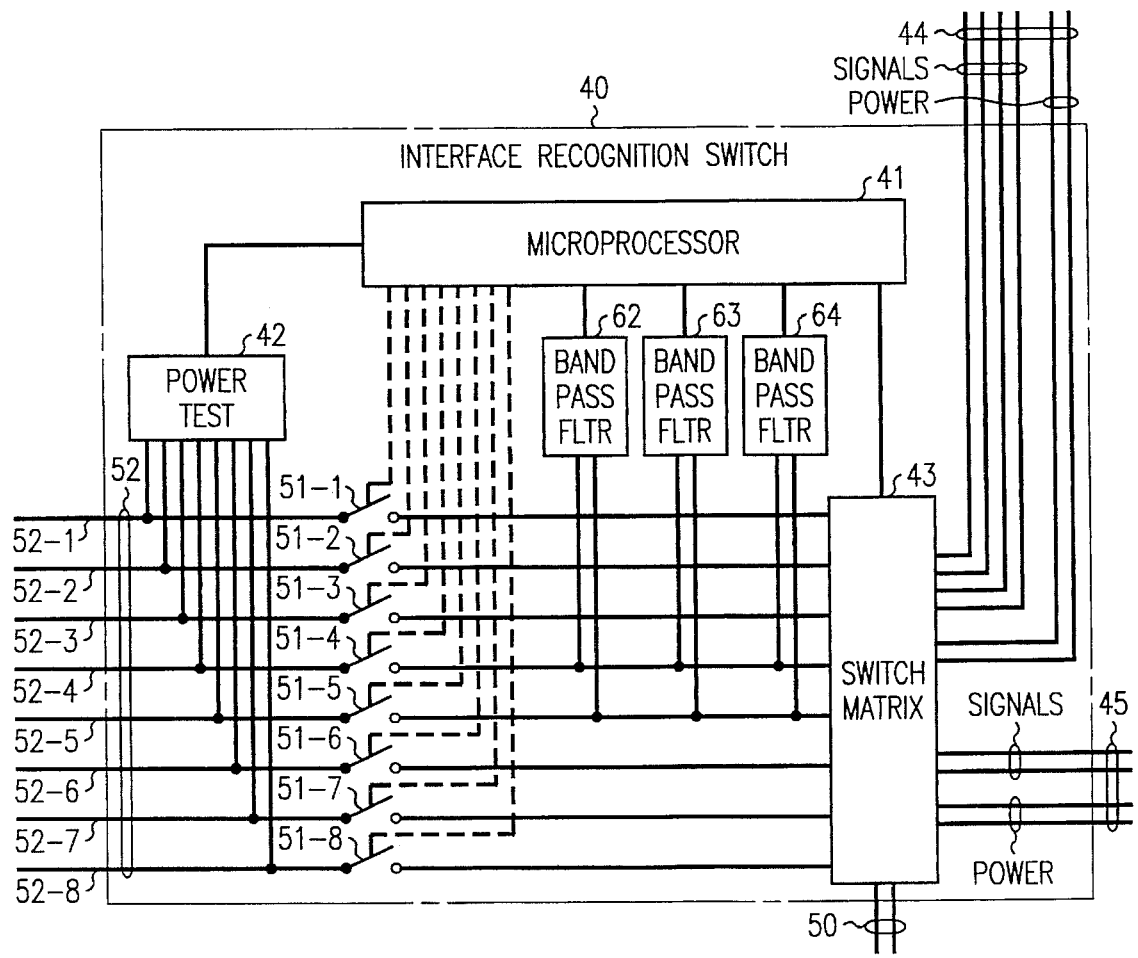
FIG. 2 is a block diagram of the interface recognition switch used in the interface recognition unit of the invention.
Figure 3:
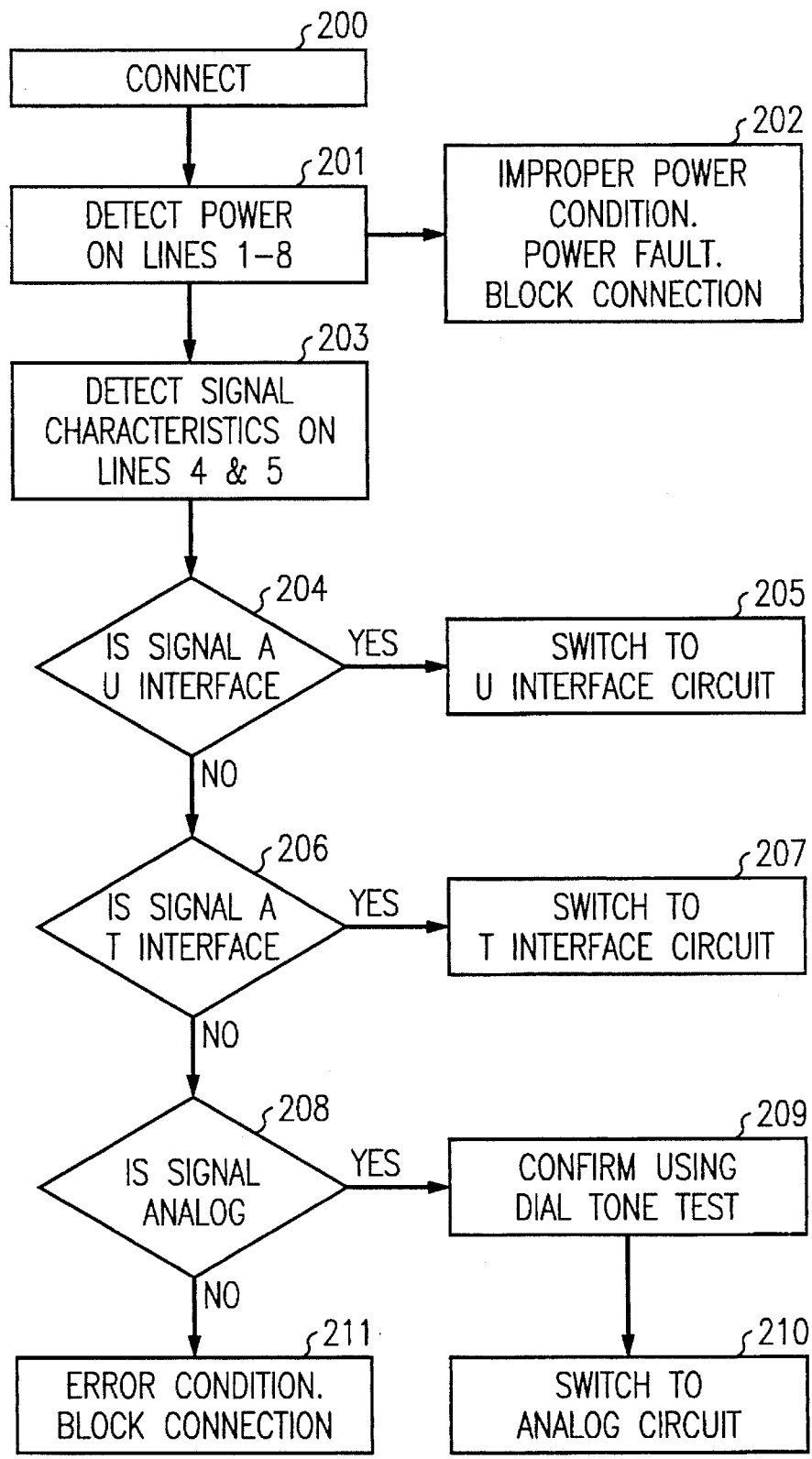
FIG. 3 is a flow chart of the operation of the CPE of FIG. 1.

As best shown in FIGS. 1A and 2, the T interface output 44 of the IRS 40 is connected to the T interface circuit 47 of interface recognition unit 12 via lines 44-3 through 44-6 for signaling and lines 44-7 and 44-8 for power. T interface circuit 47 is of a standard construction and delivers the signals of the T interface output to the multiplexer 48. The U interface output 45 of interface recognition unit 12 is connected to the U interface circuit 46 via lines 45-4 and 45-5 for signaling and lines 45-7 and 45-8 for power. The output from U interface circuit is also connected to multiplexer 48. The multiplexed signals from multiplexer 48 are delivered to ISDN circuit 30 via line 38 to power and control the higher functions of the CPE.

The operation of the CPE of the invention will now be described with specific reference to the flow diagram of FIG.

3. Operation begins when the network interface 14 is connected to CPE interface 12 (block 200). The IRS 16 first detects the power on lines 52-1 through 52-8 delivered from network interface 14 (block 201). If a power condition other than that corresponding to the standard ISDN T and U interfaces or an analog interface exists, microprocessor 41 recognizes a power fault and maintains the switches open to block the connection (block 202). The signal characteristics are then detected for frequency peaks corresponding to the different interfaces (block 203). If a U interface is detected (block 204), the signals are switched through the U interface circuit and then to the multiplexer for controlling the ISDN CPE (block 205). If the signal is a T interface (block 206) (either by testing directly for the T interface or based on assumption that any signal that is not a U interface must be a T interface), it is switched by the IRS to the T interface circuit and then to the multiplexer for controlling the ISDN CPE (block 207). If none of the standard interfaces are present, an error condition exists and the connection is blocked by opening switches 51-1 through 51-8 (block 211). The signal characteristics on lines 52-4 and 52-5 are then detected for analog service (block 208) and the signal characteristics are detected to confirm this conclusion (block 209). If the frequency peaks corresponding to analog service are detected the signals are switched to analog output 50 in switch matrix 43 (block 210).

Figure 1C:
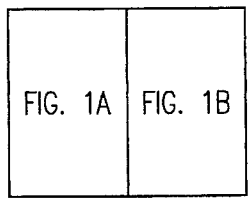
FIG. 1C is a diagram showing the relationship of FIGS. 1A and 1B.

An alternate system of interfacing the standard network U and T interfaces with the CPE is illustrated in FIG. 4 and is based, in part, on the existing capabilities of a typical ISDN CPE. The reference numerals used to identify components in the embodiment of FIG. 1 are used to identify the same components in the system of FIG. 4. CPE 10 includes ISDN circuit 30 and analog circuit 29, previously described with reference to FIG. 1. The ISDN circuit 30 and analog circuit 29 are connected to handset 22, speaker 27, terminal 28 and facsimile machine 37 as previously described.

Interface adapter 400 includes T interface circuit 47 and U interface circuit 46 as described with reference to FIG. 1; however, the IRS of the FIG. 1 embodiment is replaced with interface adapter switch 402. Interface adapter switch 402, receives signals from CPE interface 39 on lines 52-1 through 52-8 and includes T interface output signals 44 connected to T interface circuit 47 and U interface output signals 45 connected to U interface circuit 46. Analog output 50 connects interface adapter switch 402 to analog circuit 29. Thus, the interface adapter 400 has substantially the same configuration as the interface recognition unit of the FIG. 1 embodiment except that IRS 40 is replaced by interface adapter switch 402.

Interface adapter switch 402 is shown in detail in FIG. 5 and includes power test 42 connected to leads 52-1 through 52-8 as previously described with reference to FIG. 2. The output of power test 42 is connected to microprocessor 406 such that microprocessor 406 controls the open/closed position of switches 51-1 through 51-8 in the same manner as described with reference to the embodiment of FIG. 1.

Switch matrix 43 is connected to leads or connectors 52-1 through 52-8 and has a T interface output 44 and U interface output 45. Microprocessor 406 controls the configuration of switch matrix 43 to route the incoming signals on leads 52-1 through 52-8 to either the T interface output 44 or the U interface output 45.

Unlike the FIG. 1 embodiment, the interface adapter of FIG. 4 does not determine the line characteristics (the type of interface) of the signals on lines 52-1 through 52-8. Instead, microprocessor 41 controls the configuration of switch matrix 43 based on information received from station set controller 26. The station set controller 26 in a typical ISDN CPE consists of a microprocessor such as the Motorola 68000 family processor.

As will be appreciated, the microprocessor or station set controller 26 in the typical ISDN CPE includes a program to determine if the CPE is operative. Specifically, ISDN subscriber line 13 (for both U and T interfaces) constantly transmits a signal known in the art as INFO2 over the B-channel. A compatible CPE, upon receiving this signal, transmits a return signal to the network known in the an as INFO3. Upon receipt of this signal, the network transmits a signal to the CPE known in the art as INFO4. Upon receipt of the INFO4 signal, the CPE station set controller 26 recognizes that LAYER 1 communications are established between the network and CPE and that the CPE is operable.

Figure 4A:
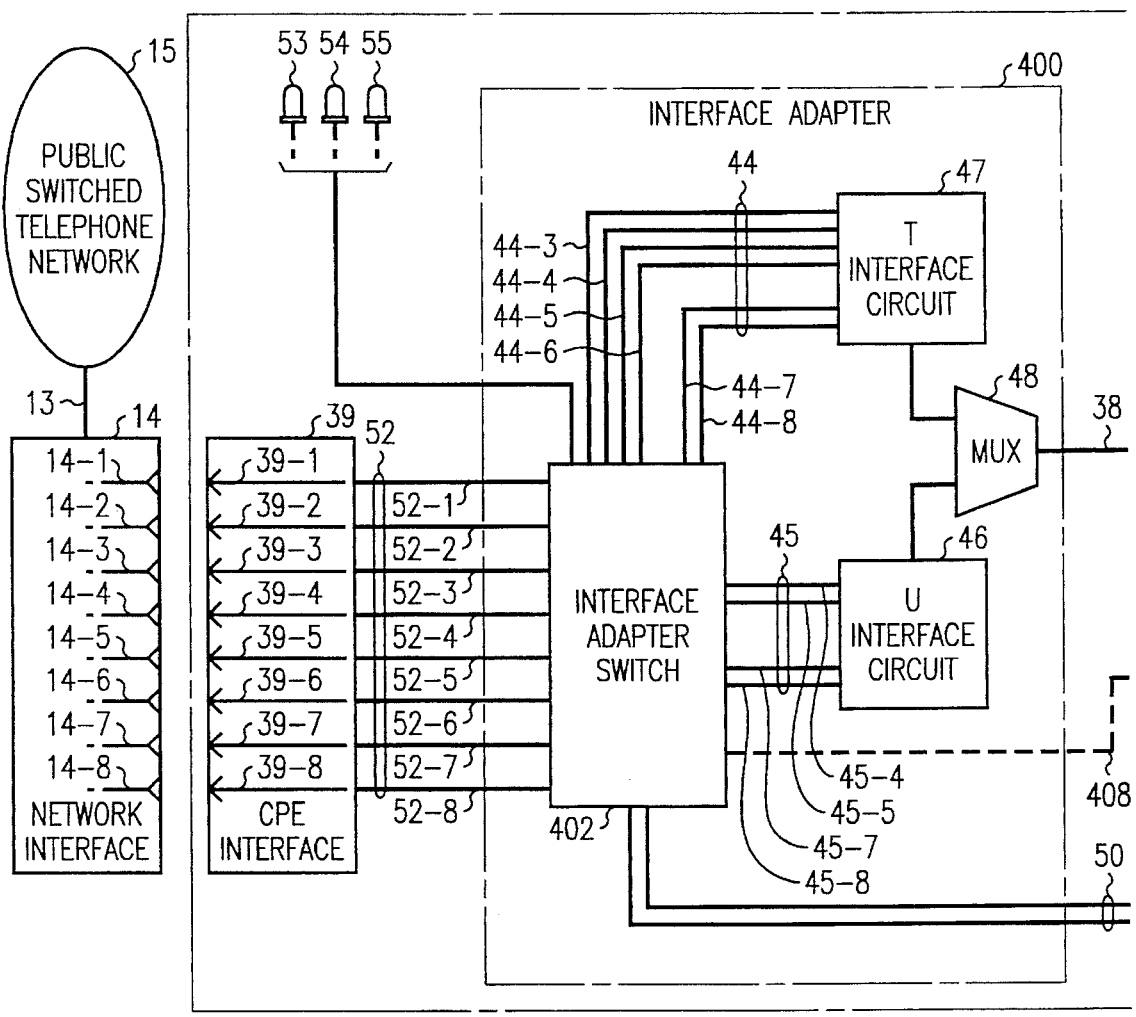
FIG. 4A is a portion of a block diagram of a CPE including an alternate embodiment of an interface adapter of the invention.
Figure 4B:
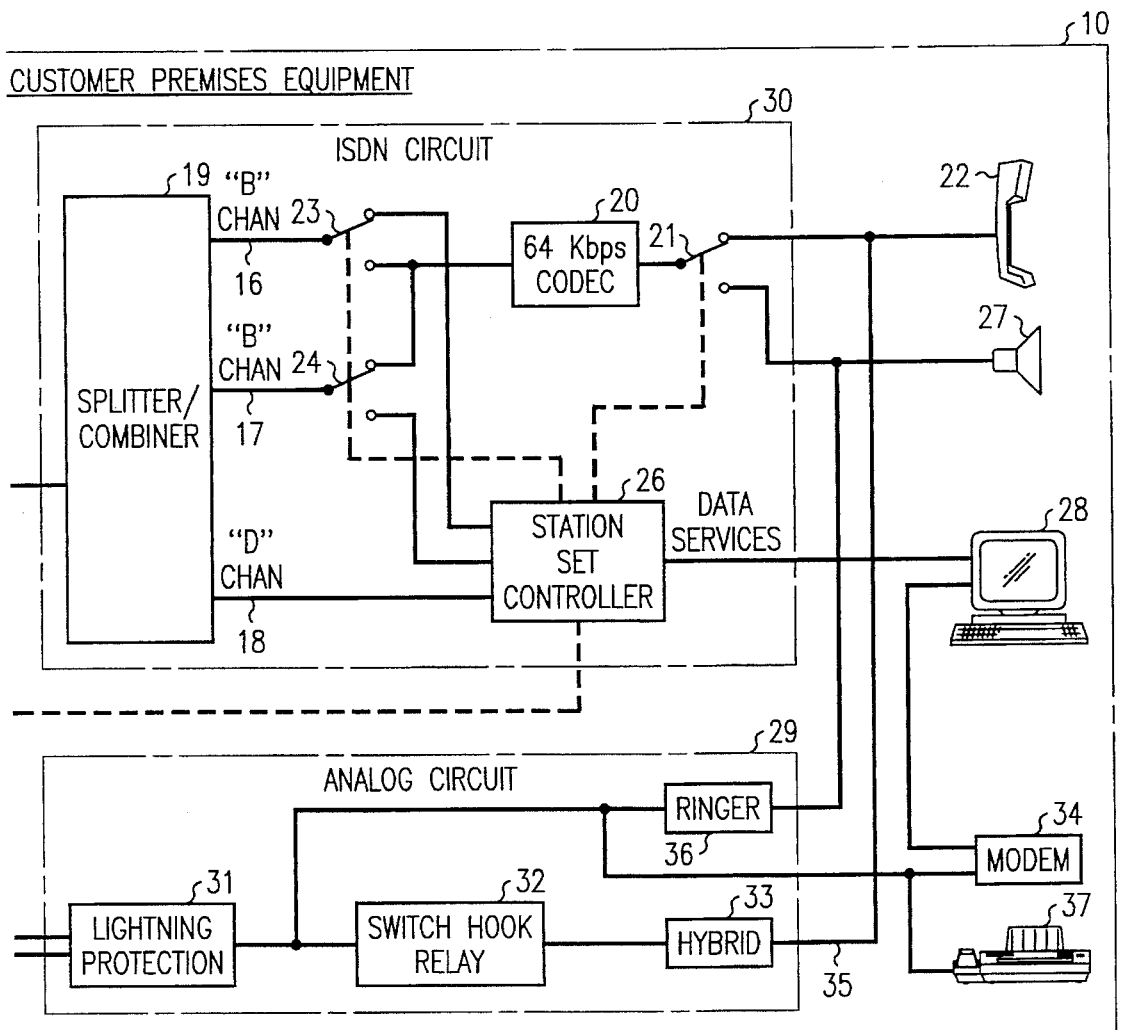
FIG. 4B is another portion of the block diagram of a CPE including the interface adapter of the invention.
Figures 4C, 5:
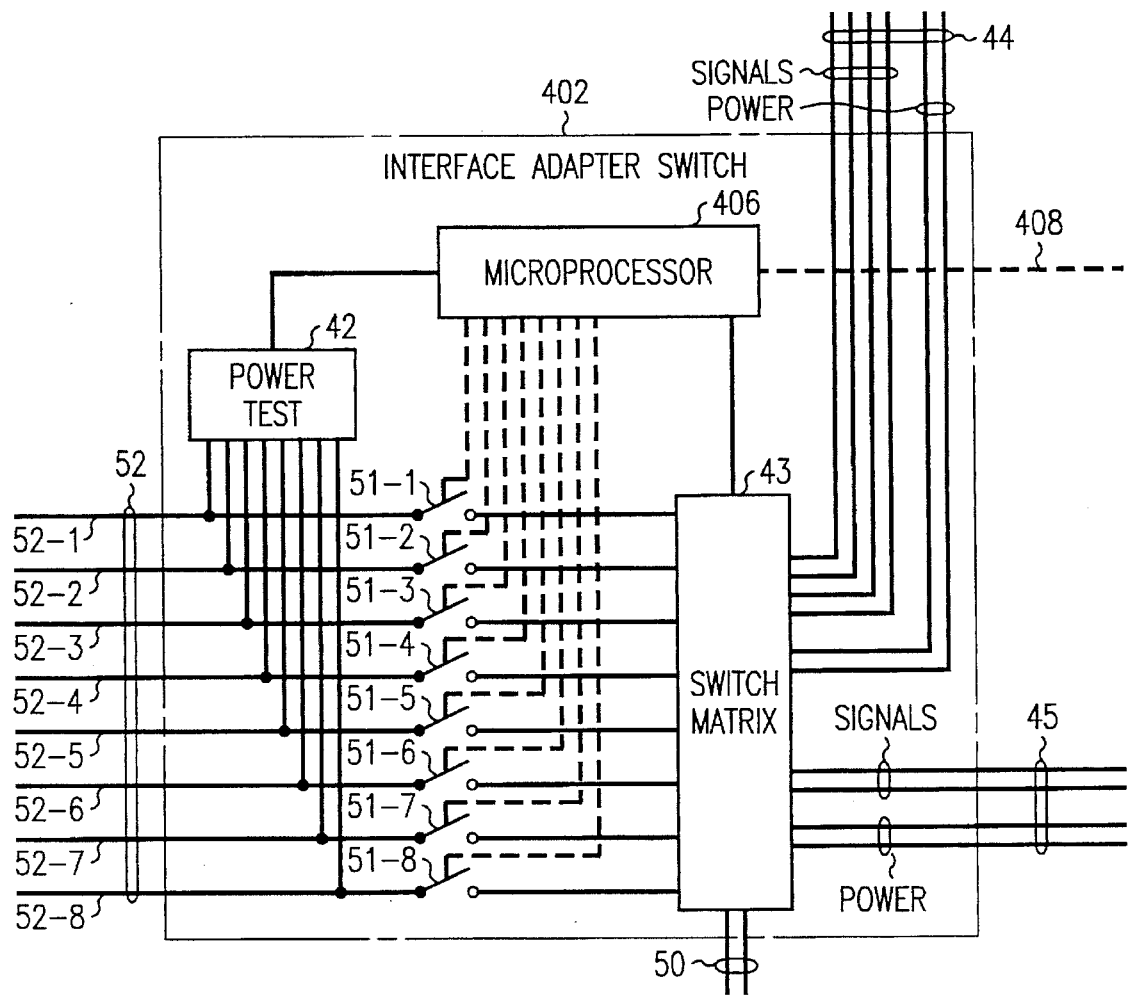
FIG. 4C is a diagram showing the relationship of FIGS. 4A and 4B.
FIG. 5 is a block diagram of the interface adapter switch used in the interface adapter of the invention.

To utilize this existing capability, microprocessor 406 of interface adapter switch 402 communicates with station set controller 26 over data link 408 (FIGS. 4A, 4B and 5). Station set controller 26 includes a program for informing microprocessor 406 of the status of the CPE 10 such that microprocessor 406 is aware of the transmission of the INFO2, INFO3 and INFO4 messages and consequently, of the establishment of LAYER 1 communication.

Figure 6:
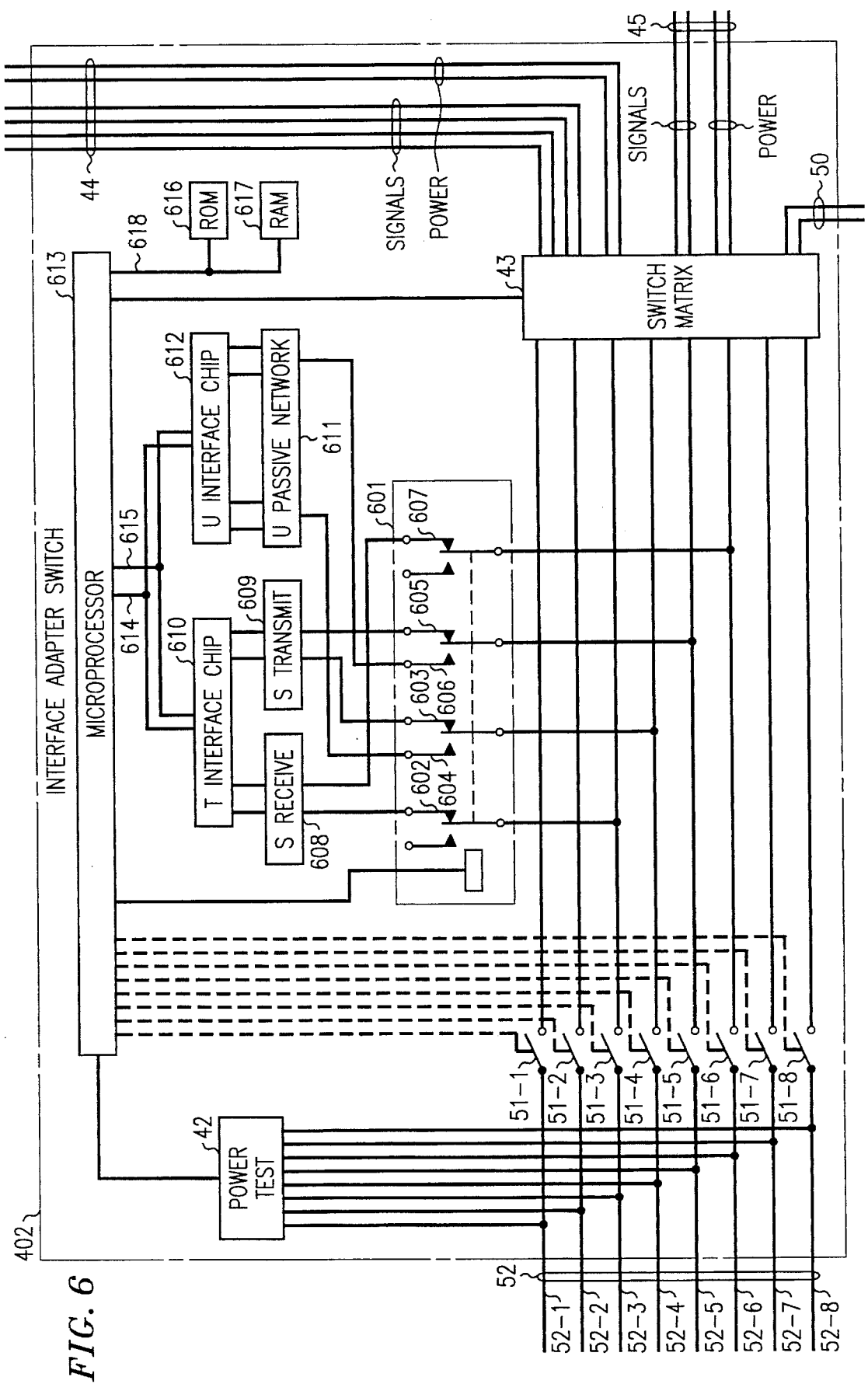
FIG. 6 is a block diagram of exemplary circuitry for the interface adapter switch.
Figure 7:
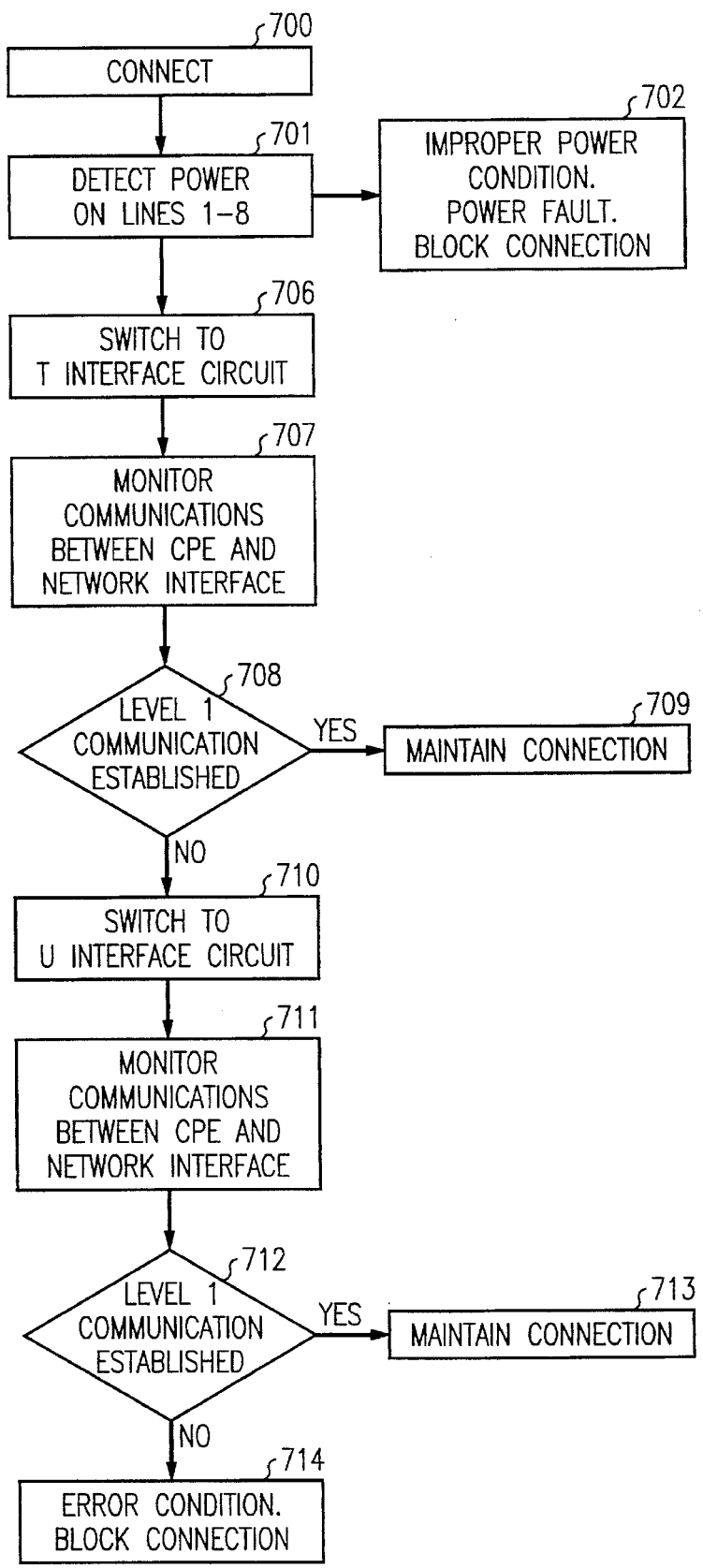
FIG. 7 is a flow chart illustrating the operation of the embodiment of FIG. 4.

The operation of this embodiment will now be described with specific reference to the flow chart of FIG. 7. After connection of the CPE to the network interface 14 (block 700), the interface adapter switch performs the power test as previously described (block 701) and maintains switches 51-1 through 51-8 open to block the connection if the desired power conditions for analog or ISDN service do not exist (block 702). The interface recognition switch 402 configures switch matrix 43 to route the signals from network interface 14 on leads 52-1 through 52-8 to T interface output 44 where they are delivered to T interface circuit 47 for controlling ISDN circuit 30 (block 706). Station set controller 26, upon receipt of these signals, attempts to establish LAYER 1 communication as is known in the art. Processor 406 monitors the communications between the station set controller 26 and network 14 over data link 408 such that processor 406 knows whether the INFO1, INFO2 and INFO3 messages have been transmitted (block 707) and whether LAYER 1 communications have been established. If, after a predetermined period of time (i.e. one second), LAYER 1 communications are established (block 708), the processor maintains the configuration of switch matrix 43 to maintain the connection (block 709). It will be appreciated that substantially the same steps are followed in the operation of the FIG. 6 embodiment except that all diagnostics take place in interface adapter switch 402 and it is relay 601 that is reconfigured to switch the signals between the U and T interface circuits. Once the type of interface is identified, switch matrix 43 is configured to deliver the signals to the appropriate circuitry for powering and controlling the CPE 10.

If after the predetermined time period., microprocessor 406 does not detect LAYER 1 communication, it reconfigures switch matrix 43 to route the signals to U interface output 45 and U to T converter 46 (block 710). The station set controller 26, upon receipt of the converted signals, again communicates with network 14 in a second attempt to set up LAYER 1 communications. Again, microprocessor 406 monitors these communications (block 711). If LAYER 1 communications are established (i.e INFO3 message transmitted) (block 712), the configuration of switch matrix 43 is maintained to maintain the connection (block 713). If the LAYER 1 communications are not established in the predetemined period of time an error condition exists and switches 51-1 through 51-8 are opened by microprocessor 406 to block the connection (block 714).

Thus, by monitoring the communications between the CPE and the network, the interface adapter of the invention allows the CPE to be compatible with either the standard U or T interfaces. The interface adapter switch also monitors the power allowing the CPE to be used as an analog telephone, if desired. The advantage of this arrangement is that the interface adapter is not required to do any independent diagnostics other than monitoring the communications between the network and CPE. Moreover, because the signals are delivered to the ISDN circuit 30, if the CPE is for some reason able to operate with a non-standard network interface, the interface adapter will not block the connection even though the network interface is not a standard T or U interface.

An alternative to having microprocessor 406 communicate with the station set controller 26 is to have the test for LAYER 1 communications be performed in the interface adapter 400. Referring to FIG. 6, leads 52-3 through 52-6 are connected to a quad pole, double throw relay 601. Relay 601 either can connect leads 52-3 and 52-4 to poles 604 and 606 or can connect leads 52-3, 52-4, 52-5 and 52-6 to poles 602, 603, 605, and 607, respectively. Poles 602 and 605 are connected to a passive T transmit interface network 609 and poles 602 and 607 are connected to a passive T receive interface network 608. Passive interface networks 608 and 609 include transformers for physically and electrically isolating the components of the system from the network. Passive networks 608 and 609 are connected to a T interface chip 610 such as the Motorola MC145475. Poles 604 and 606 are connected to U interface passive network 611 such as the 2B1Q interface that also provides physical and electrical isolation. Passive network 611 is connected to a U interface chip such as the Motorola MC145472. In this manner the system will be able to test for both U and T interface.

Both T interface chip 610 and U interface chip 612 are connected to microprocessor 613 by a first serial bus 614 for transmitting ISDN D-channel information and a second serial bus 615 such as the Motorola Serial Control Port (SCP). Processor 613 is connected to a ROM 616 and a RAM 617 over an address, data and control bus 618. The RAM and ROM include the instructions for running the system of the invention as well as parameters, intermediate variables and the like as will be appreciated by one skilled in the art.

In operation, it is irrelevant which configuration relay 601 assumes when the CPE 10 is connected to the network interface 14, although ideally the leads will be connected to the circuitry associated with the more common interface. For purposes of explanation, leads 52-3 through 52-4 are connected to the T interface circuitry, as shown in FIG. 6. When the CPE is connected to a network interface 14, processor 613 will initiate the T interface chip 610 in an attempt to establish LAYER 1 communication with the network. The processor 613 will monitor the communications between the network and T interface chip 610 for a predetermined time period, and if LAYER 1 communication is not established within that time period, processor 613 will reconfigure relay 601 to connect leads 52-4 and 52-5 to U interface network 611. Processor 613 will initiate chip 612 in a second attempt to establish LAYER 1 communication with the network. If, after the predetermined time interval, LAYER 1 communication is not established, microprocessor 613 will recognize an error condition and block the connection. Should a LAYER 1 connection be established with either the U or T interface chips, switch matrix 43 will be configured to route the signals either to T output 44 or U output 48 as appropriate. Note, serial bus 614 is used only after the LAYER 1 connection is established for upper level communications and is not used in the initial configuration of the system.

It should be noted that station set controller 26 could be used to control all of the functions of either the interface recognition unit or the interface adapter rather than using a separate microprocessors, provided that station set controller can communicate with the other components of the interface recognition unit and interface adapter. Finally, while the interface recognition unit and interface adapter are shown and described as being integral with the CPE 10, it is possible that these units could be separate modules that releasably connect to a standard CPE. In such an embodiment, the output of T interface circuit 47 could be connected to an interface such as the RJ-45 interface that releasable connects to the existing interface on the CPE.

The CPE of the invention can be used with either an ISDN T interface and ISDN U interface or an analog line interface. Thus, the CPE user can connect the CPE to most network interfaces and obtain the corresponding service. Moreover, the IRS and interface adapter switch block the connection where inappropriate power levels or signals are detected thereby protecting the CPE. The CPE eliminates diagnostic problems for the user and allows the user to connect and disconnect to most interfaces as desired and obtain either ISDN or analog service.

While the invention has been described in detail with respect to the drawings, it is to be understood that numerous changes could be made in the details of the construction and operation of the invention without departing from the scope of the invention as set forth in the appended claims.

The invention claimed is:

1. In customer premise equipment (CPE), a method for enabling connection of the CPE to any one of a plurality of network interfaces including an ISDN U interface, an ISDN T interface or an analog line interface where the network interfaces each include a plurality of conductors for transmitting power and signals to the CPE, comprising the steps of:

engaging a CPE interface with one of the network interfaces to create an electrical pathway between said plurality of conductors and conductors in the CPE interface to deliver power and signals between the network interface and the CPE interface;

detecting for the power on selected ones of said plurality of conductors and comparing the detected power with an expected power for said network interfaces;

blocking the delivery of power to the CPE if the detected power does not correspond to the expected power;

switching the signals to a first connection as if said one of said network interfaces was one of said ISDN U or T interfaces, said first connection delivering said signals and power to circuitry controlling operation of the CPE;

determining if the CPE is operating; and if the CPE is not operating, switching the signals to a second connection as if said one of said network interfaces was the other one of said ISDN U or T interfaces, said second connection delivering said signals and power to circuitry controlling operation of the CPE.

2. The method of claim 1, further including the step of displaying the type of network interface at the CPE.

3. A method of operating customer premise equipment (CPE) enabling connection to any one of a plurality of different types of network interfaces where each of said types of network interfaces includes a plurality of conductors for transmitting power and signals to the CPE, comprising the steps of:

connecting a CPE interface to one of said plurality of network interfaces to create an electrical pathway between said plurality of conductors and conductors in the CPE interface to deliver power and signals between the network interface and the CPE interface where all of said plurality of network interfaces are connectable to the same CPE interface;

switching said signals to a first connection as if said one of said plurality of network interfaces was a first type of interface, said first connection delivering the signals and power to circuitry for controlling the CPE for the first type of network interface;

determining if the CPE is operating;

if the CPE is not operating, switching the signals to a second connection as if said one of said plurality of network interfaces was a second type of interface, said second connection delivering the convened signals and power to circuitry for controlling the CPE for the second type of interface.

4. Customer premise equipment (CPE) for connection to any one of a plurality of different types of network interfaces where each type of network interface includes a plurality of conductors for transmitting power and signals to the CPE, comprising:

means for connecting a CPE interface with one of said plurality of types of network interfaces to create an electrical pathway between said plurality of conductors of the network and corresponding conductors in the CPE interface to deliver power and signals between the network interface and the CPE interface where all of said plurality of network interfaces are connectable to the same CPE interface;

means for switching the signals as if said one of said plurality of network interfaces was a first type of interface to a first connection corresponding to said first type of network interface, said connection delivering said signals and power to circuits in the CPE for processing the signals to control the operation of the CPE;

means for generating an error signal if the CPE is not operating; and means for switching the signals as if said one of said plurality of network interfaces was a second type of interface to a second connection corresponding to said second type of network interface upon receipt of the error signal.

5. The apparatus of claim 4, wherein said means for generating an error signal includes an ISDN station set controller.

6. The apparatus of claim 5, further including means for transmitting said error signal form said station set controller to said means for switching.

7. The apparatus of claim 4, further including means for displaying the type of network interface at the CPE.

8. Customer premise equipment (CPE) for connection to any one of a plurality of types of network interfaces including an ISDN U interface, an ISDN T interface or an analog line interface where the network interfaces each include a plurality of conductors for transmitting power and signals to the CPE, comprising:

means for engaging a CPE interface with one of the network interfaces to create an electrical pathway between said plurality of conductors and conductors in the CPE interface to deliver power and signals between the network interface and the CPE interface;

means for detecting for the presence of power on selected ones of said plurality of conductors;

means for comparing the detected presence of power with a known presence of power corresponding to said plurality of types of interfaces to determine if said one of the network interfaces is one of the plurality of types of interfaces;

means for blocking the delivery of power to the CPE if the detected presence of power does not correspond to the known presence of power;

means for switching the signals to a first connection corresponding to one of the network interfaces, said connection delivering said signals and power to circuitry means for processing the signals to control operation of the CPE;

means for generating an error signal if the CPE is not operating; and means for switching the signals to a second connection corresponding to another network interface upon receipt of said error signal.

9. An apparatus for allowing customer premise equipment (CPE) to connect to any one of a plurality of different types of network interfaces, said network interfaces each including a plurality of conductors for transmitting signals and power, comprising:

an interface for connection to one of said plurality of network interfaces such that an electrical pathway is created between said plurality of conductors of the network interface and corresponding conductors of said interface;

means for detecting for the presence of power on selected ones of said corresponding conductors;

means for comparing the detected presence of power with a desired presence of power corresponding to said plurality of types of interfaces to determine if said one of the network interfaces is one of the plurality of types of interfaces;

means for blocking the delivery of power, if the detected presence of power does not correspond to the desired presence of power;

means for switching the signals to a first connection corresponding to one of the plurality of different types of network interfaces, said connection delivering said signals and power to circuitry for processing the signals and power;

means for connecting said circuitry to CPE interface;

means for generating an error signal if the CPE is not operational; and means for switching the signals to a second connection corresponding to another one of the plurality of different types of network interfaces in response to said error signal, said connection delivering said signals and power to circuitry for processing the signals and power.

* * * * *

UNITED STATES PATENT AND TRADEMARK OFFICE
CERTIFICATE OF CORRECTION

PATENT NO.  : 5,577,115

DATED       : November 19, 1996

INVENTOR(S) : Douglas A. Deutsch, Norman W. Petty, Douglas J. Rippe

It is certified that error appears in the above-identified patent and that said Letters Patent is hereby corrected as shown below:

Column 11, line 24, delete "convened" and substitute --converted--.

Column 11, line 58, delete "form" and substitute --from--.

Signed and Sealed this

Eleventh Day of March, 1997

*Attest:*

BRUCE LEHMAN

*Attesting Officer*   *Commissioner of Patents and Trademarks*